(12) United States Patent
Keenan et al.

(10) Patent No.: US 7,909,554 B2
(45) Date of Patent: Mar. 22, 2011

(54) INFLATABLE BAG-IN-BAG CARGO DUNNAGE BAG FABRICATED FROM POLYWOVEN MATERIAL

(75) Inventors: Thomas C. Keenan, Brentwood, TN (US); Vincent B. Raucoules, Franklin, TN (US)

(73) Assignee: Illinois Tool Works Inc., Glenview, IL (US)

(*) Notice: Subject to any disclaimer, the term of this patent is extended or adjusted under 35 U.S.C. 154(b) by 612 days.

(21) Appl. No.: 11/979,452

(22) Filed: Nov. 2, 2007

(65) Prior Publication Data

US 2009/0116927 A1    May 7, 2009

(51) Int. Cl.
    *B60P 7/08* (2006.01)
(52) U.S. Cl. .................. 410/119; 410/155
(58) Field of Classification Search .......... 410/117, 410/118, 119, 125, 128, 155; 383/25, 109, 383/113; 206/522, 593; 428/35.2
See application file for complete search history.

(56) References Cited

U.S. PATENT DOCUMENTS

| 4,044,693 | A | 8/1977 | Ramsey, Jr. |
| 5,730,564 | A * | 3/1998 | Howlett, Jr. .............. 410/119 |
| 5,788,438 | A | 8/1998 | Goshorn et al. |
| 5,868,534 | A | 2/1999 | Goshorn et al. |
| 5,908,275 | A | 6/1999 | Howlett, Jr. et al. |
| 6,095,732 | A | 8/2000 | Howlett, Jr. et al. |
| 6,432,495 | B1 | 8/2002 | Berrier et al. |

FOREIGN PATENT DOCUMENTS

| EP | 0978461 | 2/2000 |
| GB | 2267466 | 12/1993 |
| WO | WO9808011 | 2/1998 |

* cited by examiner

*Primary Examiner* — Stephen Gordon
(74) *Attorney, Agent, or Firm* — Law Offices of StevenW. Weinrieb

(57) ABSTRACT

An inflatable cargo dunnage bag comprises an inflatable bladder, a first inner bag, and a second outer bag, wherein the inner and outer bags are fabricated from polywoven thermoplastic material so as to render the dunnage bag light in weight and moisture resistant whereby the dunnage bag can be used in the maritime industry. The first inner and second outer bags are also provided with exterior coating so as to enhance the impact resistance, perforation resistance, and abrasion resistance of the dunnage bag. The dunnage bag is also provided with handles which not only facilitate the manipulation and handling of the dunnage bag, but in addition, permits the dunnage bag to be suspendingly attached to cargo loads so as not to be displaced from the cargo loads.

15 Claims, 4 Drawing Sheets

US 7,909,554 B2

INFLATABLE BAG-IN-BAG CARGO DUNNAGE BAG FABRICATED FROM POLYWOVEN MATERIAL

FIELD OF THE INVENTION

The present invention relates generally to inflatable cargo dunnage bags, and more particularly to a new and improved inflatable cargo dunnage bag which comprises an inflatable bladder fabricated from linear low density polyethylene (LLDPE), a first inner bag fabricated from a polywoven material, such as, for example, polypropylene, and a second outer bag which is also fabricated from a polywoven material, such as, for example, polypropylene, wherein the new and improved bag-in-bag combination cargo dunnage bag is relatively light in weight and substantially lighter in weight as compared to conventional cargo bags fabricated from a suitable rubber or neoprene material, and still further, as a result of the cargo bag being fabricated from the aforenoted polywoven material, the new and improved bag-in-bag combination, unlike conventional cargo dunnage bags fabricated from a multiplicity of paper plies, is moisture-resistant so as to effectively render the cargo bag uniquely useable in connection with the stowage and protection of maritime cargo loads. Yet further, the second outer bag is provided with an exterior coating so as to effectively enhance the impervious properties of the cargo dunnage bag thereby effectively providing the same with enhanced impact resistance, perforation resistance, and abrasion resistance, all of which contribute to an extended service life for the cargo bag. Still yet further, the cargo dunnage bag is provided with handles which not only facilitate the manipulation and handling of the cargo dunnage bag, but in addition, effectively facilitates the fact that the dunnage bag will substantially remain at its fixed position within the cargo hold so as to in fact serve its purpose of preventing the cargo loads from undergoing undesirable or unwarranted movement within the cargo hold.

BACKGROUND OF THE INVENTION

Various types of cargo dunnage bags, for securing cargo loads, for stabilizing such cargo loads, and for preventing such cargo loads from undergoing relatively large undesirable or unwarranted movements within, for example, the cargo holds, cargo containers, and the like, of various ships, trailers, trains, and the like, whereby the cargo loads would otherwise not be properly secured and therefore subjected to damage as a result of the various shifting movements of the transportation vehicle during shipping or transportation, are of course well known in the art and industry. In addition, it is also known that the cargo dunnage bags may be fabricated from various different materials. Cargo dunnage bags, to be utilized, for example, within the cargo holds of ships, are quite large in size, on the order of, for example, forty eight inches (48.00") wide and ninety-six inches (96.00") long. Accordingly, when such cargo dunnage bags are fabricated from a suitable rubber or neoprene material, they will comprise or entail a substantial amount of weight, such as, for example, on the order of approximately thirty-two pounds (32.00 lbs.). Usage of such cargo dunnage bags, fabricated, for example, from a suitable rubber or neoprene material, is shown within FIG. 1, wherein, for example, a plurality of rubber cargo dunnage airbags 10 are interposed between particular rows or columns of cargo loads, such as, for example, large rolls of paper stock 12. In view of the foregoing, that is, the size and weight of the cargo dunnage bags 10, it can be readily appreciated that it is difficult and tedious for operator personnel to manipulate and install the cargo dunnage bags 10 within the cargo holds.

In an effort to reduce the weight of cargo dunnage bags, some cargo dunnage bags have been fabricated from, for example, a multiplicity of paper plies. Examples of such cargo dunnage bags, fabricated from a multiplicity of paper plies, may be found within U.S. Pat. No. 6,432,495 which issued to Berrier et al. on Aug. 13, 2002, U.S. Pat. No. 6,095,732 which issued to Howlett, Jr. et al. on Aug. 1, 2000, U.S. Pat. No. 5,908,275 which issued to Howlett, Jr. et al. on Jun. 1, 1999, and U.S. Pat. No. 5,788,438 which issued to Goshorn on Aug. 4, 1998. While these cargo dunnage bags are quite satisfactory from an operational point of view, that is, they do substantially secure, stabilize, and prevent the cargo loads from undergoing or experiencing any unwarranted movements during transportation or shipping such that the cargo loads will not experience or be subjected to any significant damage, the fact that such cargo dunnage bags are effectively fabricated from paper renders the same somewhat vulnerable to deteriorating factors, such as, for example, moisture, when the cargo dunnage bags are utilized, for example, within the cargo holds of maritime shipping. In addition, as a result of the cargo dunnage bags being effectively fabricated from paper, the cargo dunnage bags are also somewhat susceptible to being damaged as a result of being punctured, abraded, or the like. All of these factors could possibly lead to a relatively shortened service life for the dunnage bags. Lastly, it is also important to effectively tie, secure, or otherwise fix the cargo loads and the cargo dunnage bags together as opposed to the cargo dunnage bags being simply inserted between the various cargo loads. The reason for this is that the cargo dunnage bags could in fact shift their positions, with respect to the cargo loads, during the shipping or transportation of the cargo loads in view of the various external forces which may be impressed upon the transportation or shipping vessel and which, in turn, will be transmitted to the cargo loads, as may be encountered during the shipping or transportation of the cargo loads.

A need therefore exists in the art for a new and improved cargo dunnage bag wherein the cargo dunnage bag can be fabricated from materials which are relatively light in weight so as to render the cargo dunnage bag more easily movable and manipulable by means of operator personnel, wherein the cargo dunnage bag is moisture resistant so as to permit the cargo dunnage bag to be used within maritime environments without experiencing deterioration which would ordinarily reduce the service life of the cargo dunnage bag substantially, wherein the cargo dunnage bag is impact and abrasion resistant so as also enhance the service life of the cargo dunnage bag, and wherein the cargo dunnage bag is provided with means for facilitating the relatively easy movement or manipulation of the same by operator personnel as well for enabling the cargo dunnage bag to effectively be secured with respect to the cargo load such that the cargo dunnage bag will effectively be prevented from moving or shifting position with respect to the cargo load which would effectively render the cargo load unstable, improperly secured, and susceptible to movement and damage as a result of external forces impressed upon the transportation or shipping vessel and as transmitted to the cargo load.

SUMMARY OF THE INVENTION

The foregoing and other objectives are achieved in accordance with the teachings and principles of the present invention through the provision of a new and improved inflatable cargo dunnage bag which comprises an inflatable bladder which is fabricated from linear low density polyethylene (LL-DPE), a first inner bag fabricated from a suitable polywoven material, such as, for example, polypropylene, and a second outer bag which is also fabricated from a suitable polywoven material, such as, for example, polypropylene, whereby the new and improved bag-in-bag combination cargo dunnage bag is relatively light in weight and substantially lighter in weight as compared to conventional cargo dunnage bags fabricated from a suitable rubber or neoprene material. In addition, as a result of the cargo dunnage bag being fabricated from the aforenoted polywoven material, the new and improved bag-in-bag combination cargo dunnage bag, unlike conventional cargo dunnage bags fabricated from a multiplicity of paper plies, is moisture-resistant so as to effectively render the cargo dunnage bag uniquely useable in connection with the stowage and protection of cargo loads being utilized within the maritime industry.

Yet further, the second outer bag is provided with an exterior coating so as to effectively enhance the impervious properties or puncture resistance of the cargo dunnage bag thereby effectively providing the same with enhanced impact resistance, perforation resistance, and abrasion resistance, all of which contribute to an extended service life for the cargo dunnage bag. Still yet further, the cargo dunnage bag is provided with a plurality of handles which not only facilitate the manipulation and handling of the cargo dunnage bag by means of operator personnel, but in addition, effectively facilitates the attachment of the cargo dunnage bag to the cargo loads so as to ensure the fact that the cargo dunnage bag will remain substantially at its fixed position with respect to the cargo loads disposed within the cargo hold and thereby in fact serve its purpose of preventing the cargo loads from shifting or undergoing undesirable or unwarranted movement within the cargo hold during the shipping or transportation of the cargo loads.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
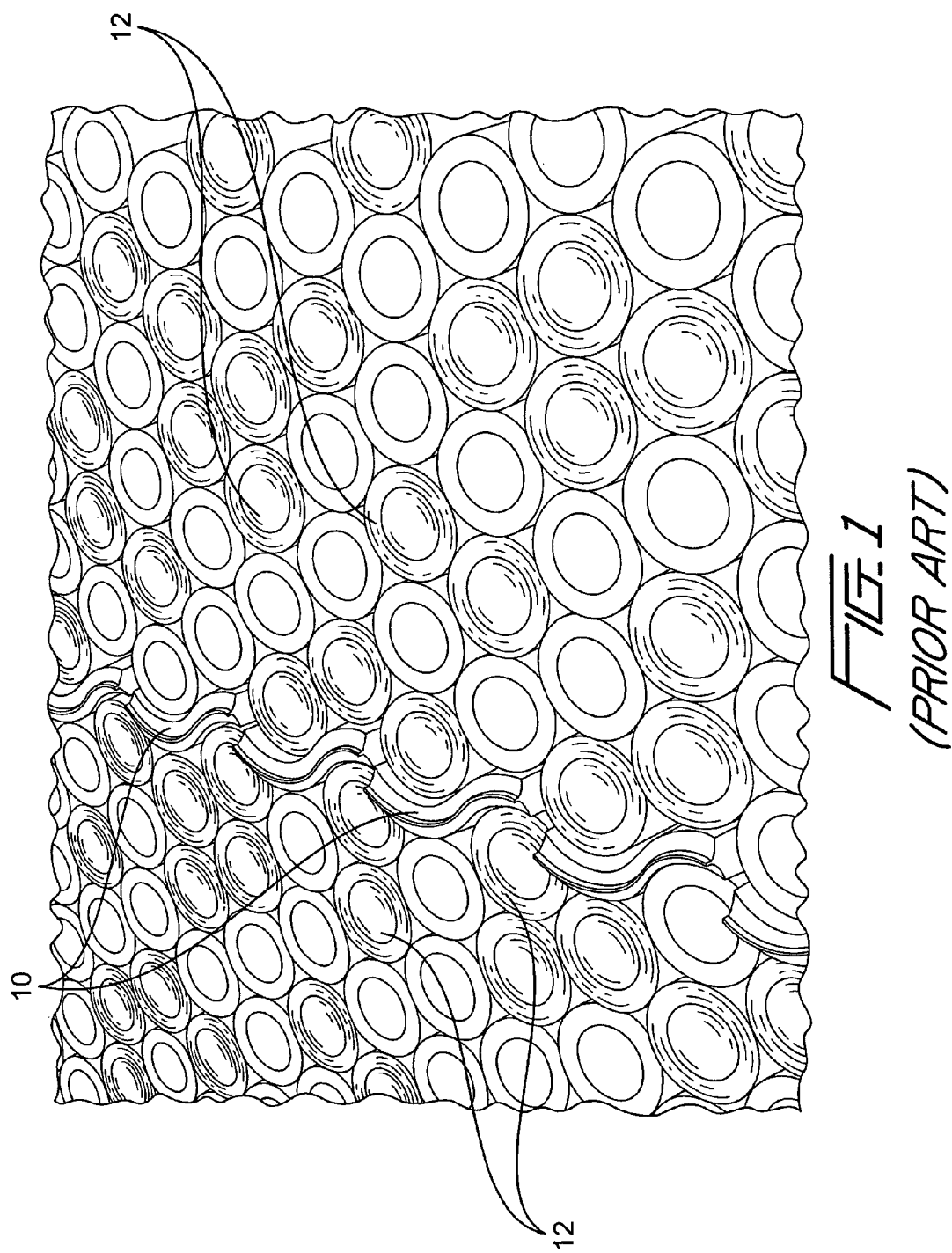
FIG. 1 is a perspective view of a typical cargo hold within which a cargo load, such as, for example, a plurality of rolls of paper, is disposed, and wherein conventional cargo dunnage bags, fabricated from rubber, are interposed between predetermined columns or rows of the rolls of paper comprising the overall cargo load.
Figure 2:
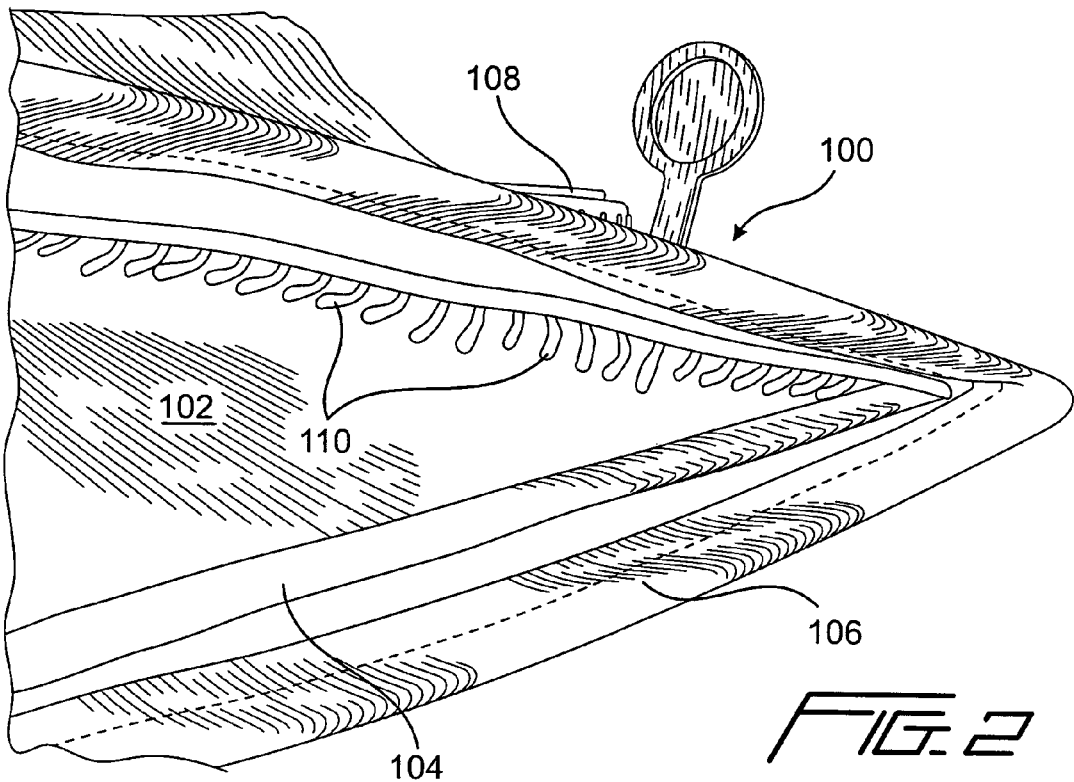
FIG. 2 is a perspective view of the new and improved bag-in-bag cargo dunnage bag as constructed in accordance with the principles and teachings of the present invention and showing the cooperative parts thereof, wherein it is seen that the inflatable bladder has been inserted within the first inner polywoven bag, and that the subassembly, comprising the inflatable bladder and the first inner polywoven bag, has been inserted into the second outer polywoven bag.
Figure 3:
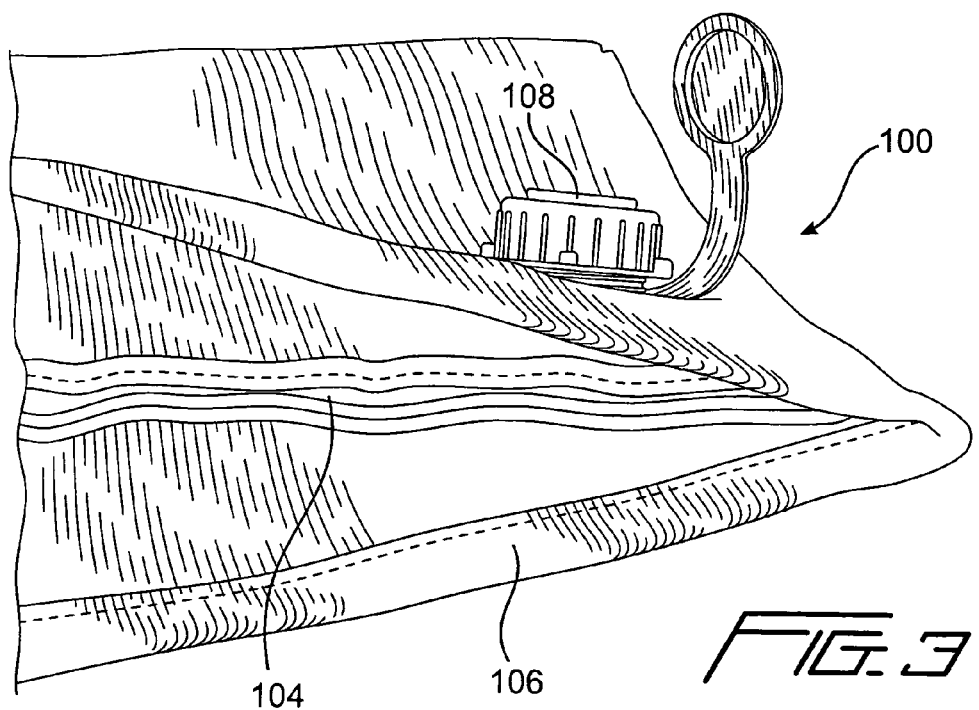
FIG. 3 is a perspective view, substantially similar to that of FIG. 2, of the new and improved bag-in-bag cargo dunnage bag as constructed in accordance with the principles and teachings of the present invention, showing, however, the open end of the first inner polywoven bag having been stitched closed so as to securely contain the inflatable bladder therewithin.

Referring now to the drawings, and more particularly to FIG. 2 thereof, a new and improved bag-in-bag cargo dunnage bag, constructed in accordance with the principles and teachings of the present invention and illustrating the cooperative parts thereof, is disclosed and is generally indicated by the reference character 100. More particularly, in accordance with a first unique feature characteristic of the new and improved bag-in-bag cargo dunnage bag as constructed in accordance with the principles and teachings of the pre-sent invention, it is seen that the new and improved cargo dunnage bag 100 comprises an inflatable bladder 102, a first inner bag 104 within which the inflatable bladder 102 is adapted to be disposed so as to effectively form a subassembly comprising the inflatable bladder 102 and the first inner bag 104, and a second outer bag 106 within which the subassembly, comprising the inflatable bladder 102 and the first inner bag 104, can be disposed. The inflatable bladder 102 can be made of any suitable thermoplastic material, such as, for example, linear low density polyethylene (LLDPE), while the first inner bag 104 can be fabricated from a suitable thermoplastic material, such as, for example, a polywoven material comprising woven polypropylene, and in a similar manner, the second outer bag 106 can likewise be fabricated from a suitable thermoplastic material, such as, for example, a polywoven material comprising woven polypropylene. An inflation valve member 108 is fixedly secured to the cargo dunnage bag 100 so as to be externally accessible and yet fluidically connected to the interior of the inflatable bladder 102 so that suitable filling apparatus, not shown, can be fluidically connected to or mated with the inflation valve member 108 whereby, for example, compressed air or the like may be fluidically conducted into the inflatable bladder 102 in order to inflate the cargo dunnage bag 100 as and when may be desired. The use of the first inner and second outer bags 104, 106, so as to effectively define the dual or bag-in-bag structure characteristic of the cargo dunnage bag 100, enhances the burst strength properties of the cargo dunnage bag 100 when compared to single cargo dunnage bag structures.

Figure 4:
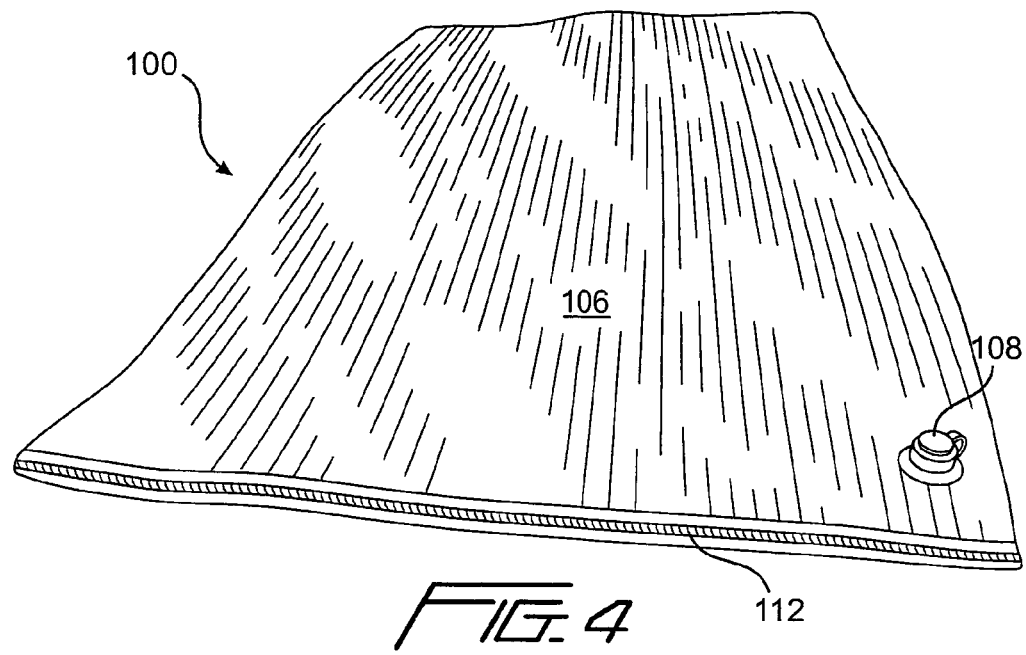
FIG. 4 is a perspective view, substantially similar to that of FIG. 3, of the new and improved bag-in-bag cargo dunnage bag as constructed in accordance with the principles and teachings of the present invention, showing, however, the open end of the second outer polywoven bag having been stitched closed so as to securely contain the subassembly, comprising the inflatable bladder and the first inner polywoven bag, therewithin.

In connection with the fabrication or manufacture of the new and improved bag-in-bag cargo dunnage bag 100, it is to be appreciated that once the inflatable bladder 102 has been inserted internally within an open end portion of the first inner bag 104, the open end portion of the first inner bag 104 will be closed and sealed as a result of, for example, stitching or sewing of the same as can best be seen at 110 in FIG. 2 whereby the aforenoted subassembly, comprising the inflatable bladder 102 and the first inner bag 104, is able to be formed. Subsequently, the subassembly, comprising the inflatable bladder 102 and the first inner bag 104, is then inserted into an open end portion of the second outer bag 106, whereupon the open end portion of the second outer bag 106 can now be closed and sealed by means of, for example, sewing or stitching as can best be seen at 112 in FIGS. 4 and 5. It is noted that the open ends of the first inner bag 104 and the second outer bag 106 are sewn or stitched because closure or sealing of the open ends of such bags by means of a suitable glue or adhesive is not readily achievable due to fact that glue or adhesive will not readily adhere to the polywoven materials. It is to be further appreciated that as a result of the aforenoted fabrication or manufacture of the new and improved bag-in-bag cargo dunnage bag 100, that is, for example, as a result of fabricating the cargo dunnage bag 100 from the aforenoted polyethylene and polypropylene materials, the cargo dunnage bag 100 is substantially lighter in weight than a conventional and comparable cargo dunnage bag. As has been previously noted, cargo dunnage bags of the aforenoted type typically have external dimensions of forty-eight inches (48.00") wide and ninety-six inches (96.00") long, and when they are fabricated from rubber or neoprene, they can weigh approximately thirty-two pounds (32.00#). To the contrary, the new and improved cargo dunnage bag 100, being characterized by means of comparable external dimensions, only weighs approximately ten pounds (10.00#). This comprises a substantial reduction in the overall weight of the cargo dunnage bags which permits operator personnel to more easily move or maneuver the cargo dunnage bags when positioning the same with respect to the cargo loads.

Still further, as a result of the fabrication or manufacture of the new and improved cargo dunnage bag 100 from the aforenoted thermoplastic materials, and more specifically, as a result of the respective fabrication or manufacture of the inflatable bladder 102, and the first inner and second outer bags 104, 106, from polyethylene and woven polypropylene, as opposed to conventionally respectively manufacturing such cargo dunnage bag components from rubber and paper, the new and improved cargo dunnage bag 100 is rendered especially useful in connection with the securing, stabilizing, and protecting of cargo loads being transported or shipped by means of maritime shipping. As one can readily appreciate, during maritime shipping, the cargo loads will be exposed to environmental conditions which will entail or comprise high levels of moisture, humidity, and the like which would otherwise cause the relatively rapid deterioration of cargo dunnage bags fabricated or manufactured from, for example, a plurality or multiplicity of paper plies.

Still yet further, it is to be appreciated that as a result of the fabrication or manufacture of the new and improved cargo dunnage bag 100 from the aforenoted thermoplastic materials, and more specifically, as a result of the fabrication or manufacture of the second outer bag 106 from woven polypropylene, as opposed to, again, conventionally fabricating or manufacturing, for example, the second outer bag 106 of the cargo dunnage bag 100 from a plurality or multiplicity of paper plies, the impact resistance, perforation resistance, and abrasion resistance of the overall cargo dunnage bag 100 is substantially enhanced, thereby contributing or positively affecting the expected service life of the cargo dunnage bag 100. Along these lines, it is to be noted yet still further that in accordance with a second unique feature characteristic of the new and improved bag-in-bag cargo dunnage bag as constructed in accordance with the principles and teachings of the present invention, the first inner and second outer bags 104, 106 of the new and improved cargo dunnage bag 100 may be coated with a suitable coating which effectively enhances the stiffness, rigidity, and the like of the bags 104, 106 so as to, in turn, render the bags 104, 106 more impervious. Accordingly, the new and improved cargo dunnage bag 100 exhibits still further enhanced impact resistance, puncture resistance, and abrasion resistance, which enhances or increases the service life of the cargo dunnage bag 100 still further. More particularly, the coating may comprise a coating of polypropylene which is applied to the external surface portions of the bags 104, 106 through means of a suitable extrusion process whereby the coating material effectively fills any interstices defined between the various woven regions of the polywoven material comprising the first inner and second outer bags 104, 106. The coating may have, for example, a thickness dimension of approximately two and one-half mils (2.5 mil).

Figure 5:
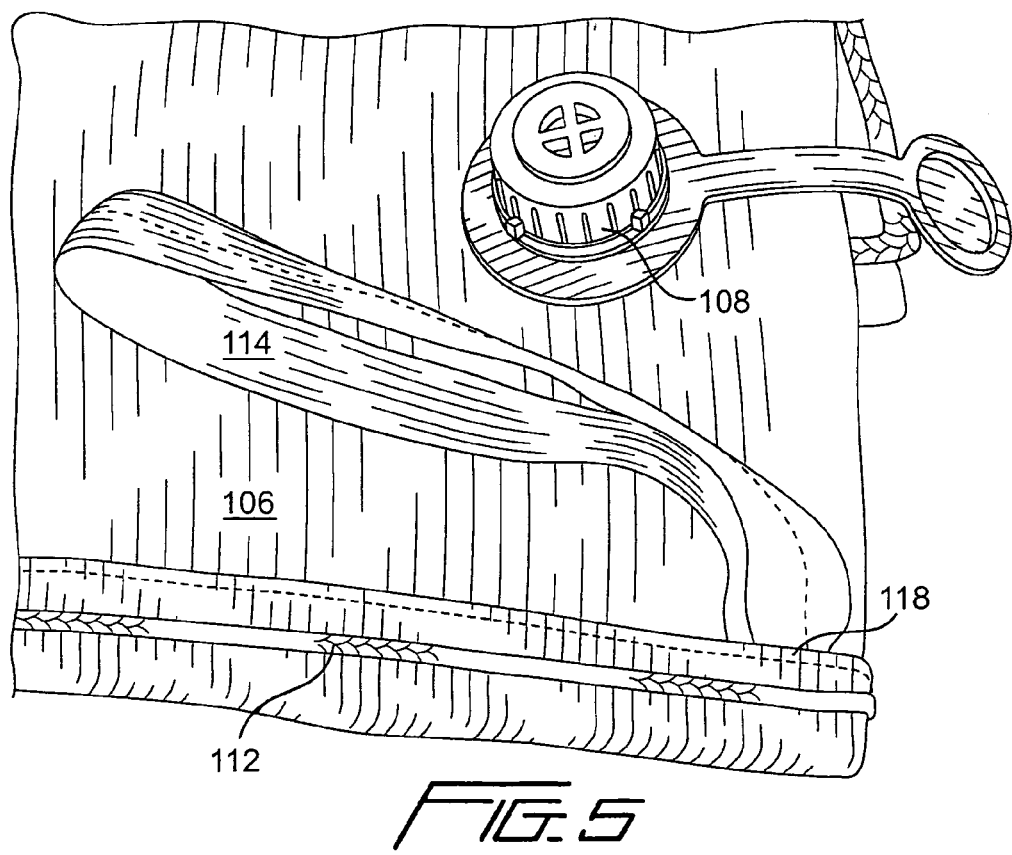
FIG. 5 is an enlarged, perspective view, partially showing one corner region of the new and improved bag-in-bag cargo dunnage bag, as constructed in accordance with the principles and teachings of the present invention, wherein one of the two handle structures have been fixedly secured to the cargo dunnage bag.
Figure 6:
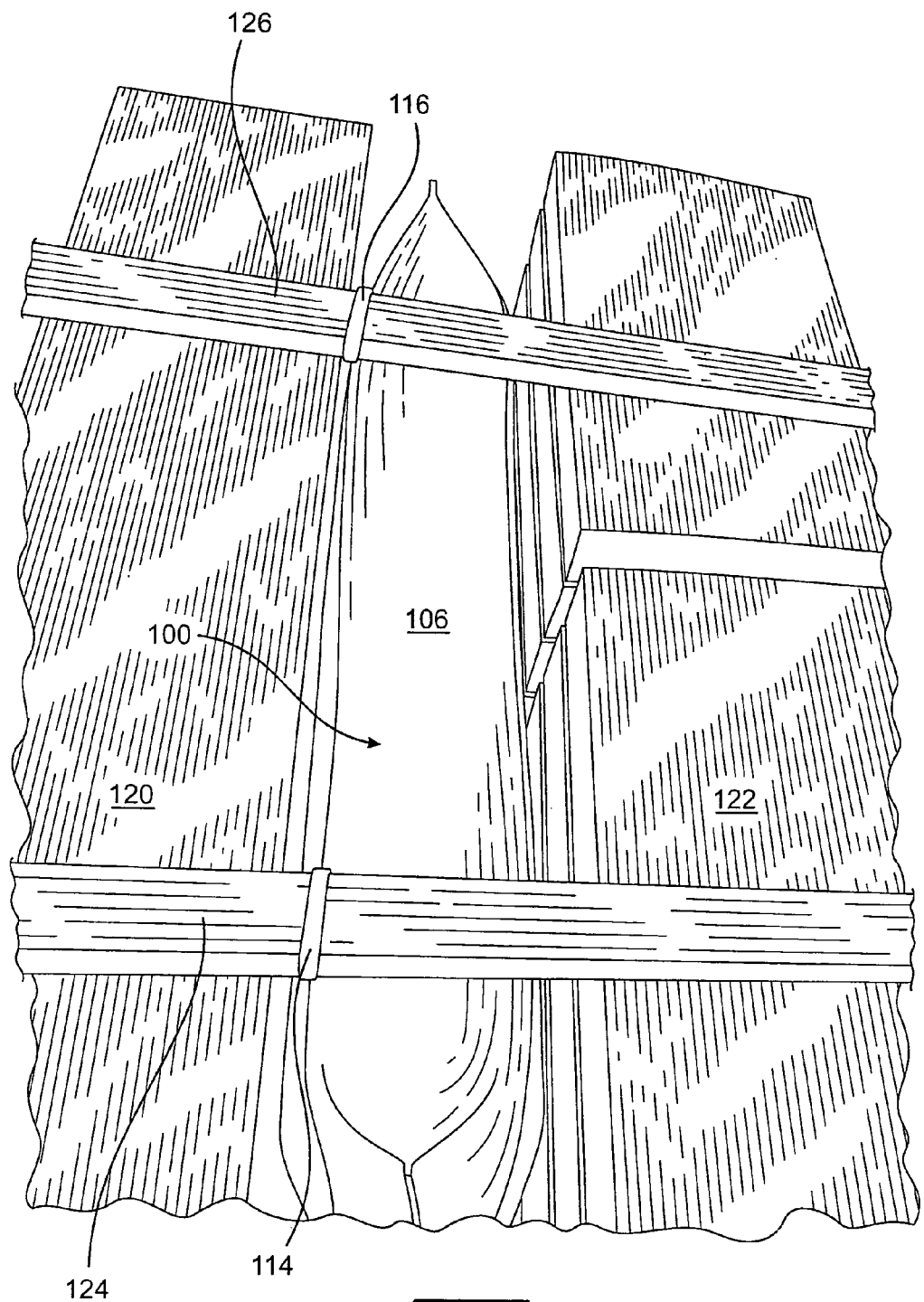
FIG. 6 is a perspective view, partially showing a cargo hold within which cargo loads are disposed, and wherein a new and improved cargo dunnage bag, as constructed in accordance with the principles and teachings of the present invention, is disclosed as being utilized in conjunction with cargo loads, disposed upon opposite sides thereof, wherein it is seen that, for example, 2×4 lumber pieces have effectively been inserted through the handle structures of the cargo dunnage bag so as to effectively secure the disposition of the cargo dunnage bag with respect to the cargo loads so as to effectively connect the cargo dunnage bag to the cargo loads whereby the cargo dunnage bag cannot be displaced from the cargo loads, and therefore, it is ensured that the cargo dunnage bag will always secure, stabilize, and prevent undesirable shifting or movement of the cargo loads so as to effectively prevent the cargo loads from undergoing or experiencing any damage that might otherwise occur due to external forces impressed upon the shipping vessel during the shipping or transportation of the cargo loads.

Lastly, as can best be seen from FIGS. 5 and 6, in accordance with a third unique and novel feature characteristic of the present invention, it is seen that the new and improved cargo dunnage bag 100 is provided with a pair of handles 114, 116 which are fixedly secured at longitudinally spaced positions which are located within the vicinity of the opposite, longitudinally spaced end portions of the cargo dunnage bag 100, and upon one side surface portion of the second outer bag 106, as can best be seen in FIG. 6. The handle structures 114, 116 are fabricated or manufactured as strips from a suitable fabric material and are looped upon themselves such that the free end portions of the strips are fixedly secured by sewing or stitching the same, as at 118, to the second outer bag 106 within the vicinity of the sewing or stitching 112 which was implemented to close or seal the open end portion of the second outer bag 106. As can therefore be readily appreciated, by providing the new and improved cargo dunnage bag 100 with the handle structures 114, 116 disposed within the vicinity of the opposite, longitudinally spaced end portions of the cargo dunnage bag 110, operator personnel can easily move or manipulate the cargo dunnage bag 10. In addition, as can best be appreciated from FIG. 6, as a result of the handle structures 114, 116 being fixedly secured upon the new and cargo dunnage bag 100, the cargo dunnage bag 100 can be positionally interposed between spaced cargo loads 120, 122, and just as importantly, positionally fixed with respect to the cargo loads 120, 122.

More particularly, once the cargo dunnage bag 100 is interposed between adjacent cargo loads 120, 122, it is important to effectively ensure that the cargo dunnage bag 100 maintain its position between the cargo loads 120, 122. This is especially important when the cargo dunnage bag 100 is utilized to stabilize, secure, and prevent the movement of cargo loads which are located within upper tier locations of, for example, a ship's cargo hold. The reason for this is that if the cargo dunnage bag 100 was simply inserted between the cargo loads 120, 122, and due to, for example, substantial movement of the shipping or transportation vessel, such as, for example, the movements a ship might be subjected to during storm conditions at sea, the cargo dunnage bag 100 might be dislodged or displaced from its position interposed between the cargo loads 120, 122 as a result of falling down to a lower cargo level or lower cargo tier within the cargo hold. The cargo loads 120, 122 would then be entirely unsecured and effectively destabilized, permitting them to become damaged as a result of substantial, undampened or unrestrained movements between the cargo loads. Accordingly, as can best be seen in FIG. 6, as a result of the provision of the handle structures 114, 116 upon the new and improved cargo dunnage bag 100, stabilizing structures, such as, for example, suitable bars or 2×4 lumber pieces 124, 126 may be inserted through the handle structures 114, 116 and disposed atop the cargo loads 120, 122. Accordingly, the cargo dunnage bag 100 will effectively be suspendedly supported by means of the stabilizing structures 124, 126 whereby the cargo dunnage bag 100 cannot be dislodged or displaced from its disposition between the cargo load 120, 122. Therefore, protection, securement, and stabilization of the cargo loads 120, 122, by means of the cargo dunnage bag 100, will be ensured as a result of movement of, and damage to, the cargo loads 120, 122 having been effectively prevented.

Thus, it may be seen that in accordance with the principles and teachings of the present invention, there has been disclosed a new and improved inflatable cargo dunnage bag which comprises an inflatable bladder which is fabricated from linear low density polyethylene (LLDPE), a first inner bag fabricated from a suitable polywoven material, such as, for example, polypropylene, and a second outer bag which is also fabricated from a suitable polywoven material, such as, for example, polypropylene, whereby the new and improved bag-in-bag combination cargo dunnage bag is relatively light in weight and substantially lighter in weight as compared to conventional cargo dunnage bags fabricated from a suitable rubber or neoprene material. In addition, as a result of the cargo dunnage bag being fabricated from the aforenoted polywoven material, the new and improved bag-in-bag combination cargo dunnage bag, unlike conventional cargo dunnage bags fabricated from a multiplicity of paper plies, is moisture-resistant so as to effectively render the cargo dunnage bag uniquely useable in connection with the stowage and protection of cargo loads being utilized within the maritime industry. Yet further, the second outer bag is provided with an exterior coating so as to effectively enhance the impervious properties or puncture resistance of the cargo dunnage bag thereby effectively providing the same with enhanced impact resistance, perforation resistance, and abrasion resistance, all of which contribute to an extended service life for the cargo dunnage bag. Still yet further, the cargo dunnage bag is provided with a plurality of handles which not only facilitate the manipulation and handling of the cargo dunnage bag by means of operator personnel, but in addition, effectively facilitates the attachment of the cargo dunnage bag to the cargo loads so as to ensure the fact that the cargo dunnage bag will remain substantially at its fixed position with respect to the cargo loads disposed within the cargo hold and thereby in fact serve its purpose of preventing the cargo loads from shifting or undergoing undesirable or unwarranted movement within the cargo hold during the shipping or transportation of the cargo loads.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A cargo dunnage bag for use in connection with cargo loads, comprising:
    a first inner bag;
    an inflatable bladder disposed internally within said first inner bag so as to form a subassembly therewith; and
    a second outer bag within which said subassembly, comprising said first inner bag and said inflatable bladder, is disposed;
    wherein said first inner bag and said second outer bag are fabricated from a polywoven thermoplastic material so as to render said cargo dunnage bag relatively light in weight and also moisture resistant so as to effectively render said cargo dunnage bag especially useful under maritime environmental conditions; and
    a coating disposed upon outer surface portions of at least said second outer bag for enhancing the impact resistance, puncture resistance, and abrasion resistance of said cargo dunnage bag by effectively filling interstices defined between various woven regions characteristic of said polywoven material comprising said inner and outer bags.

2. The cargo dunnage bag as set forth in claim 1, wherein: said polywoven material comprises polypropylene.

3. A cargo dunnage bag for use in connection with cargo loads, comprising:
    a first inner bag fabricated from a polywoven thermoplastic material;
    an inflatable bladder disposed internally within said first inner bag so as to form a subassembly therewith; and
    a second outer bag fabricated from a polywoven thermoplastic material and within which said subassembly, comprising said first inner bag and said inflatable bladder, is disposed;
    wherein a coating is disposed upon outer surface portions of at least said second outer bag so as to render said cargo dunnage bag more impact resistant, puncture resistant, and abrasion resistant by effectively filling interstices defined between various woven regions characteristic of said polywoven material comprising said inner and outer bags.

4. The cargo dunnage bag as set forth in claim 1, wherein: said coating is also disposed upon outer surface portions of said first inner bag so as to further enhance the impact resistance, puncture resistance, and abrasion resistance of said cargo dunnage bag.

5. The cargo dunnage bag as set forth in claim 4, wherein: said coating, disposed upon said outer surface portions of said first inner bag and said second outer bag, comprises polypropylene.

6. The cargo dunnage bag as set forth in claim 4, wherein: said coating, disposed upon said outer surface portions of said first inner bag and said second outer bag, is extruded onto said outer surface portions of said first inner bag and said second outer bag so as to effectively fill any interstices defined between woven regions of said polywoven thermoplastic material.

7. The cargo dunnage bag as set forth in claim 4, wherein: said coating, disposed upon said outer surface portions of said first inner bag and said second outer bag, has a thickness dimension of approximately 2.5 mil.

8. The cargo dunnage bag as set forth in claim 1, further comprising:

handle means fixedly secured to said second outer bag for facilitating the handling of said cargo dunnage bag by operator personnel.

9. The cargo dunnage bag as set forth in claim 8, wherein:

said handle means comprises closed loop structures for permitting support members to be inserted through said handle means such that the support members engage the cargo loads and suspendingly support said cargo dunnage bag between the cargo loads so as to thereby positionally secure said cargo dunnage bag with respect to the cargo loads whereby said cargo dunnage bag will not become displaced from the cargo loads.

10. The cargo dunnage bag as set forth in claim 3, further comprising:

handle means fixedly secured to said second outer bag for facilitating the handling of said cargo dunnage bag by operator personnel.

11. The cargo dunnage bag as set forth in claim 3, wherein:

said coating is also disposed upon outer surface portions of said first inner bag so as to further enhance the impact resistance, puncture resistance, and abrasion resistance of said cargo dunnage bag.

12. The cargo dunnage bag as set forth in claim 11, wherein:

said coating, disposed upon said outer surface portions of said first inner bag and said second outer bag, comprises polypropylene.

13. The cargo dunnage bag as set forth in claim 11, wherein:

said coating, disposed upon said outer surface portions of said first inner bag and said second outer bag, has a thickness dimension of approximately 2.5 mil.

14. The cargo dunnage bag as set forth in claim 12, wherein:

said coating, disposed upon said outer surface portions of said first inner bag and said second outer bag, is extruded onto said outer surface portions of said first inner bag and said second outer bag so as to effectively fill any interstices defined between woven regions of said first inner bag and said second outer bag.

15. The cargo dunnage bag as set forth in claim 10, wherein:

said handle means comprises closed loop structures for permitting support members to be inserted through said handle means such that the support members engage the cargo loads and suspendingly support said cargo dunnage bag between the cargo loads so as to thereby positionally secure said cargo dunnage bag with respect to the cargo loads whereby said cargo dunnage bag will not become displaced from the cargo loads.

* * * * *